United States Patent
Yamamoto

(10) Patent No.: US 9,862,424 B2
(45) Date of Patent: Jan. 9, 2018

(54) VEHICLE FRONT SECTION STRUCTURE

(71) Applicant: TOYOTA JIDOSHA KABUSHIKI KAISHA, Toyota-shi, Aichi-ken (JP)

(72) Inventor: Yohei Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 15/201,948

(22) Filed: Jul. 5, 2016

(65) Prior Publication Data

US 2017/0057463 A1    Mar. 2, 2017

(30) Foreign Application Priority Data

Sep. 2, 2015    (JP) .................................. 2015-173280

(51) Int. Cl.
| | | |
|---|---|---|
| *B62D 25/08* | (2006.01) | |
| *B60S 1/04* | (2006.01) | |
| *B60S 1/36* | (2006.01) | |
| *B62D 25/04* | (2006.01) | |
| *B62D 25/12* | (2006.01) | |

(52) U.S. Cl.
CPC .......... *B62D 25/081* (2013.01); *B60S 1/0402* (2013.01); *B60S 1/0408* (2013.01); *B60S 1/0463* (2013.01); *B60S 1/36* (2013.01); *B62D 25/04* (2013.01); *B62D 25/12* (2013.01)

(58) Field of Classification Search
CPC ...... B60S 1/0402; B60S 1/0463; B62D 25/04; B62D 25/081; B62D 25/12
USPC ................................... 296/181.5, 190.1, 192
See application file for complete search history.

(56) References Cited

U.S. PATENT DOCUMENTS

| | | | |
|---|---|---|---|
| 8,641,130 B2* | 2/2014 | Morden ............... | B62D 25/081 |
| | | | 296/187.04 |
| 2015/0197285 A1* | 7/2015 | Hayakawa .............. | B60R 21/34 |
| | | | 296/192 |

FOREIGN PATENT DOCUMENTS

JP    2008-056166 A    3/2008

* cited by examiner

*Primary Examiner* — Jason S Daniels
(74) *Attorney, Agent, or Firm* — Oliff PLC

(57) ABSTRACT

A vehicle front section structure includes a hood; a front windshield glass; a cowl louver; a front pillar; a front side door; a wiper arm including an arm base portion; and a flow regulating member that is provided at the cowl louver, that is disposed in a wiper storage section at a vehicle width direction outer side and at a vehicle front side of the arm base portion in a state wherein arm base portion is stored in wiper storage section, and includes a vertical wall extending in a vehicle front-rear direction and an inclined wall disposed at the vehicle front side of arm base portion, in the state wherein the arm base portion is stored in wiper storage section, and extending out from a rear end portion of the vertical wall toward the vehicle width direction outer side and toward the vehicle front side along the arm base portion.

10 Claims, 5 Drawing Sheets

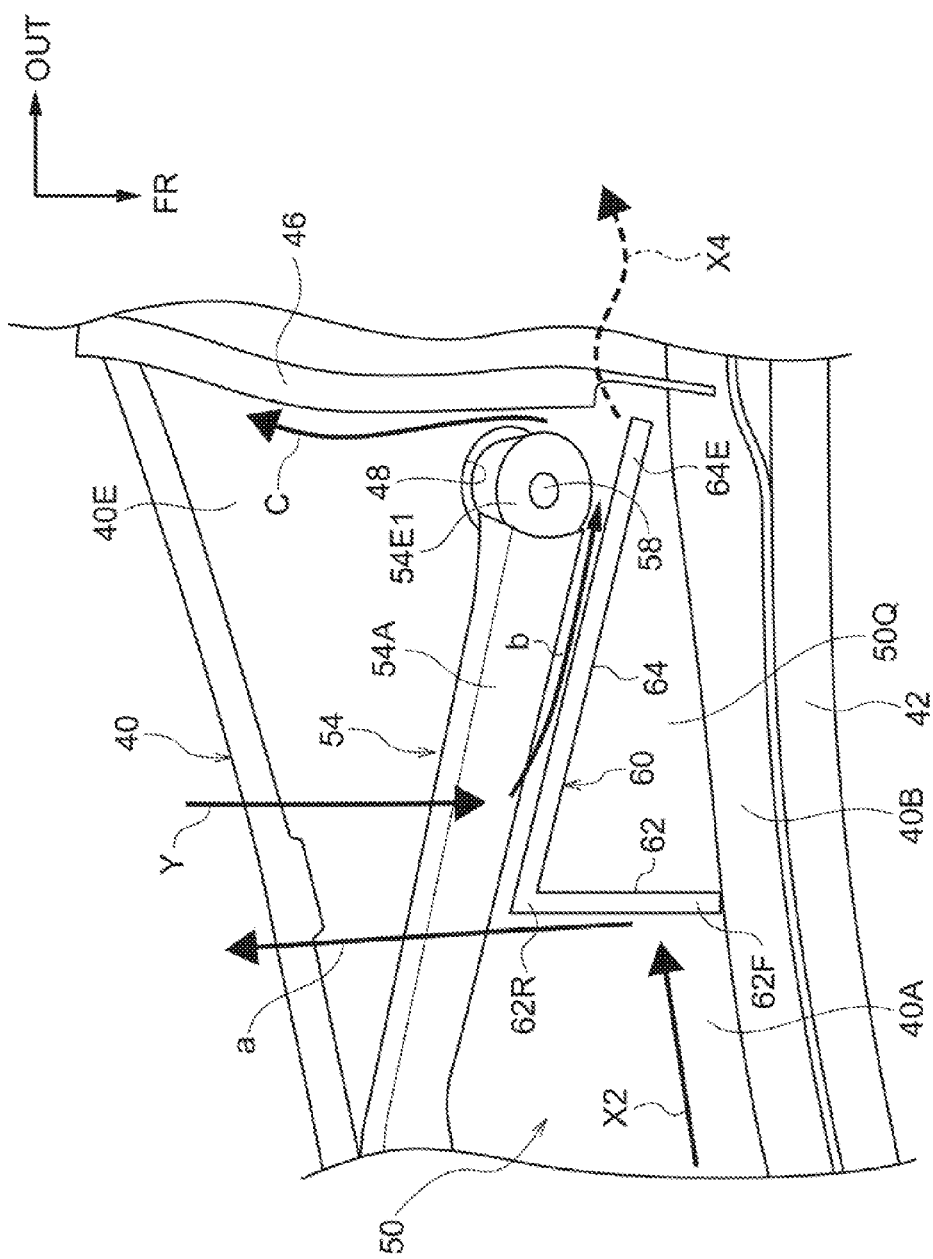

VEHICLE FRONT SECTION STRUCTURE

CROSS-REFERENCE TO RELATED APPLICATION

This application is based on and claims priority under 35 USC 119 from Japanese Patent Application No. 2015-173280 filed on Sep. 2, 2015, the disclosure of which is incorporated by reference herein.

BACKGROUND

Technical Field

The present disclosure relates to a vehicle front section structure.

Related Art

A known vehicle front section structure includes a hood provided at a vehicle front section, a front windshield glass disposed at a vehicle rear side of the hood, and a cowl louver that extends in the vehicle width direction along a lower end portion of the front windshield glass and that is disposed at a vehicle lower side of the hood (for example, see Japanese Patent Application Laid-Open (JP-A) No. 2008-56166).

For example, when travelling wind hits a lower portion of the front windshield glass, a portion of the travelling wind flows toward the vehicle front side, into a wiper storage section formed between the hood and the cowl louver, as the vehicle travels. This travelling wind flows toward a vehicle width direction outer side along the wiper storage section, and is guided toward a vehicle upper side along a lower portion of a front pillar after having passed a wiper arm.

Travelling wind that has hit a region at the vehicle width direction outer side of the front windshield glass flows toward the vehicle front side into a region at the vehicle width direction outer side in the wiper storage section. When the travelling wind collides with travelling wind flowing inside the wiper storage section described above toward the vehicle width direction outer side, the travelling wind becomes disordered, is liable to pass over a low end portion (base portion) of the front pillar, and is liable to be exhausted toward the front side door side. Travelling wind that has been exhausted toward the front side door side can become a source of noise (wind noise) when hitting a side mirror of the front side door.

SUMMARY

In consideration of the above, an object of the present disclosure is to provide a vehicle front section structure capable of suppressing travelling wind that flows inside a wiper storage section from passing over a lower end portion of a front pillar, being exhausted toward a front side door side, and hitting a side mirror, as a vehicle is travelling.

A vehicle front section structure according to a first aspect includes: a hood provided at a vehicle front section; a front windshield glass disposed at a vehicle rear side of the hood; a cowl louver that extends in a vehicle width direction along as lower end portion of the front windshield glass, that extends out from the lower end portion toward a vehicle front side, and that is disposed at a vehicle lower side of the hood; a front pillar that extends out from an end portion at a vehicle width direction outer side of the cowl louver toward a vehicle upper side and toward the vehicle rear side along an end portion at the vehicle width direction outer side of the front windshield glass; a front side door that comprises a side mirror disposed at the vehicle width direction outer side of, and at the vehicle rear side of, a lower end portion of the front pillar, and that is provided at a vehicle side portion, a wiper arm comprising an arm base portion having one end portion attached to a rotation shaft provided at as position at the vehicle width direction outer side of the cowl louver, and extending out from the rotation shaft toward a vehicle width direction inner side and toward the vehicle upper side in a state in which the arm base portion is stored in a wiper storage section formed between the hood and the cowl louver; and a flow regulating member that is provided at the cowl louver, that is disposed in the wiper storage section at the vehicle width direction outer side and at the vehicle front side of the arm base portion in the state in which the arm base portion is stored in the wiper storage section, and that comprises a vertical wall extending in as vehicle front-rear direction and an inclined wall disposed at the vehicle front side of the arm base portion, in the state in which the arm base portion is stored in the wiper storage section, and extending out from a rear end portion of the vertical wall toward the vehicle width direction outer side and toward the vehicle front side along the arm base portion.

According to the vehicle front section structure of the first aspect, the wiper storage section in which the arm base portion of the wiper arm is stored is formed between the hood and the cowl louver. One end portion of the arm base portion is attached to the rotation shaft provided at the location at the vehicle width direction outer side of the cowl louver. The arm base portion extends out toward the vehicle width direction inner side and toward the vehicle upper side from the rotation shaft, in the state in which the arm base portion is stored in the wiper storage section.

When travelling wind hits a lower portion of the front windshield glass as the vehicle travels, a portion of the travelling wind flows toward the vehicle front side and into the wiper storage section. The travelling wind that has flowed into the wiper storage section is guided to the vehicle upper side along a lower portion of the front pillar after flowing toward the vehicle width direction outer side along the wiper storage section and passing the wiper arm.

For example, travelling wind that has hit a region at the vehicle width direction outer side of the front windshield glass flows toward the vehicle front side to a region at the vehicle width direction outer side in the wiper storage section. When this travelling wind and travelling wind flowing inside the wiper storage section, described above, toward the vehicle width direction outer side, collide, the travelling winds become disordered, and are liable to pass over the lower end portion of the front pillar and are liable to be exhausted toward the front side door side. In cases in which the travelling wind that has been exhausted toward the front side door side hits the side mirror of the front side door, it is possible that this will cause noise (wind noise).

In contrast, in the present aspect, the flow regulating member having the vertical wall and the inclined wall is provided at the cowl louver. The vertical wall is disposed at the vehicle width direction outer side of the wiper storage section and at the vehicle front side of the arm base portion in the state in which the arm base portion is stored in the wiper storage section, and the vertical wall extends in the vehicle front-rear direction. Travelling wind flowing inside the wiper storage section from the vehicle width direction central side toward the outer side is accordingly guided toward the vehicle rear side by the vertical wall. As a result, the air flow of the travelling wind flowing inside the wiper storage section toward the front pillar side is reduced. Accordingly, the air flow of the travelling wind that passes over the lower end portion of the front pillar and is exhausted form the wiper storage section toward the front side door side is reduced since disorder in travelling wind described above is suppressed.

Moreover, in cases in which the air flow of the travelling wind flowing through an inner side (vehicle front side) region at the vehicle width direction outer side of the wiper storage section increases, the travelling wind is liable to pass over the lower end portion of the front pillar and is liable to be exhausted toward the front side door side.

In contrast, in the present aspect, the inclined wall is disposed at the vehicle front side of the arm base portion in the state in which the arm base portion is stored inside the wiper storage section. The inclined wall extends out from the rear end portion of the vertical wall toward the vehicle width direction outer side and toward the vehicle front side along the arm base portion. Namely, the inclined wall is disposed at the vehicle rear side of the wiper storage section in a range where the arm base portion does not interfere. The travelling wind is thereby suppressed from flowing into the inner side region at the vehicle width direction outer side of the wiper storage section. Accordingly, the air flow of travelling wind that flows from the wiper storage section, passes over the lower end portion of the front pillar, and is exhausted toward the front side door side, is further reduced.

In this manner, in the present aspect, the air flow of the travelling wind that flows from the wiper storage section, passes over the lower end portion of the front pillar, and that is exhausted toward the front side door side, is reduced as the vehicle travels. Accordingly, the travelling wind that is exhausted from the wiper storage section toward the front side door side is suppressed from hitting the side mirror. Noise (wind noise) is thereby reduced.

A vehicle front section structure according to a second aspect is the vehicle front section structure according to the first aspect, further including a pillar side flow regulating member that is provided along a lower portion of the front pillar, and that guides, toward the vehicle upper side, wind flowing in the wiper storage section toward the vehicle width direction outer side, wherein an end portion at the vehicle width direction outer side of the inclined wall is close to, or touches, the pillar side flow regulating member.

According to the vehicle front section structure of the second aspect, the pillar side flow regulating member is provided along the lower portion of the front pillar. Travelling wind that flows inside the wiper storage section toward the vehicle width direction outer side is guided toward the vehicle upper side by the pillar side flow regulating member.

The end portion of the vehicle width direction outer side of the inclined wall is close to, or touches, the pillar side flow regulating member. Accordingly, travelling wind that has been guided toward the vehicle width direction outer side by the inclined wall can easily flow toward the vehicle upper side along the pillar side flow regulating member. Accordingly, the travelling wind flowing inside the wiper storage section passes over the pillar side flow regulating member and the lower end portion of front pillar, is exhausted toward the front side door side, and is further suppressed from hitting the side mirror as the vehicle travels. Noise (wind noise) is accordingly reduced.

As explained above, in the vehicle front section structure according to the present disclosure, travelling wind, flowing inside the wiper storage section passes over the lower end portion of the front pillar, is exhausted toward the front side door side, and can be suppressed from hitting the side mirror as the vehicle travels.

BRIEF DESCRIPTION OF THE DRAWINGS

Exemplary embodiments of the present disclosure will be described in detail based on the following figures, wherein:

FIG. 5 is a face-on view illustrating the flow regulating member illustrated in FIG. 4.

DETAILED DESCRIPTION

Explanation follows regarding a vehicle front section structure according to an exemplary embodiment with reference to the drawings. In each drawing, the arrow FR indicates the vehicle front side (the vehicle front-rear direction front side), and the arrow UP indicates the vehicle upper side (the vehicle up-down direction upper side), as appropriate. The arrow OUT indicates the vehicle width direction outer side (the left side when facing the vehicle front side). In the following explanation, front-rear and up-down respectively refer to front-rear in the vehicle front-rear direction and up-down in the vehicle up-down direction, unless specifically stated otherwise.

Figure 1:
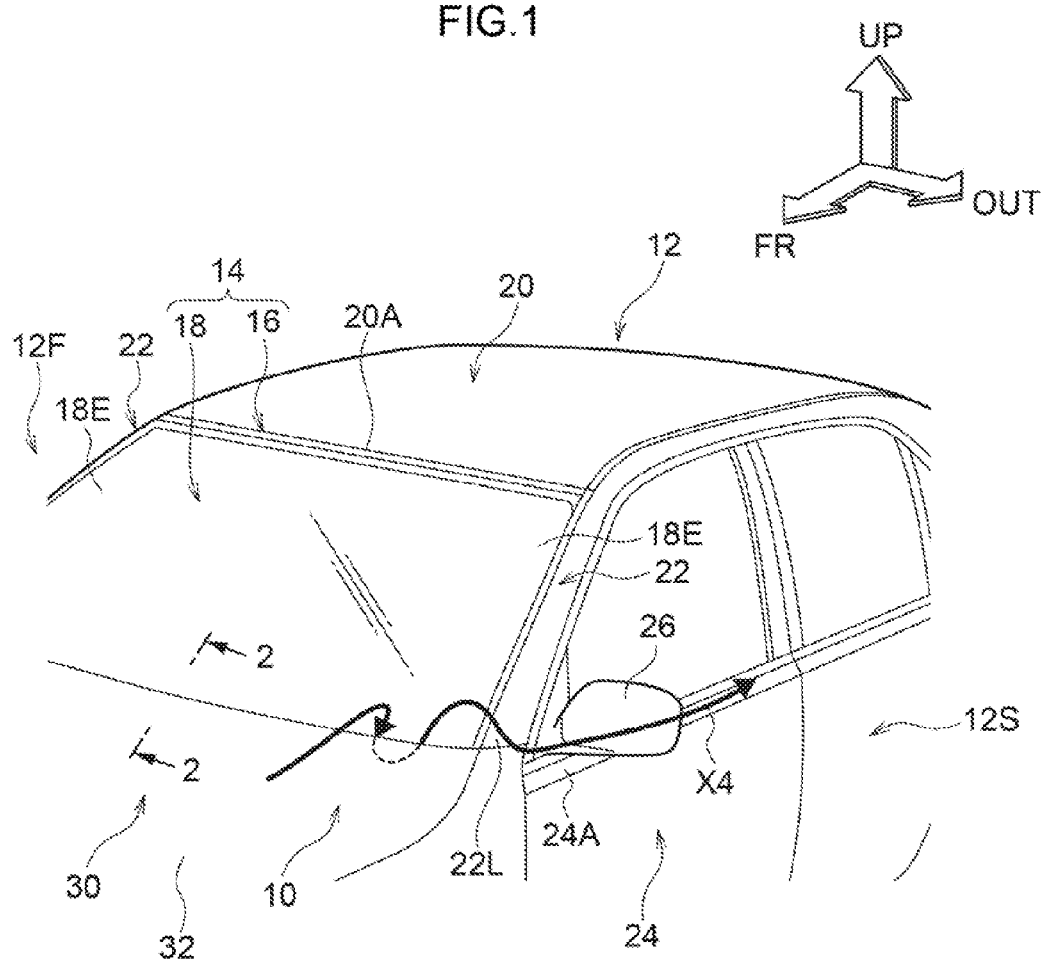
FIG. 1 is a perspective view illustrating a vehicle front section applied with a vehicle front section structure according to an exemplary embodiment.

FIG. 1 illustrates a vehicle front section 12F of a vehicle 12 applied with it vehicle front section structure 10 according to the present exemplary embodiment. The vehicle front section 12F includes a front windshield 14, a pair of front pillars 22, a pair of front side doors 24, and a hood 30.

The front windshield 14 is provided to an upper portion of a front wall of a cabin. The front windshield 14 includes a window frame 16 that is open in the vehicle front-rear direction, and front windshield glass 18 disposed inside the window frame 16.

The window frame 16 is formed with a rectangular frame shape overall. The window frame 16 includes a roof header 20A of a roof 20, the pair of front pillars 22, and a cowl louver 40 (see FIG. 2). The roof header 20A of the roof 20 forms a frame at a vehicle upper side of the window frame 16. The pair of front pillars 22 form a frame at both vehicle width direction sides of the window frame 16. The cowl louver 40 forms a frame at the vehicle lower side of the window frame 16. The front windshield glass 18 is inserted into the window frame 16.

The pair of front pillars 22 configure metal framework members extending along end portions 18E at vehicle width direction outer sides of the front windshield glass 18. The front side doors 24 provided at a vehicle side portion 12S are attached to the respective front pillars 22. The front side doors 24 are attached to the front pillars 22 and can open and close door openings, not illustrated in the drawings, formed in the vehicle side portion 12S. Side mirrors 26 are provided at respective vehicle front sides of the front side doors 24.

The side mirror (door mirror) 26 projects out from the front side door 24 at a location at the vehicle upper side of a belt line portion 24A, toward the vehicle width direction outer side. The side mirror 26 is positioned at the vehicle rear side and at the vehicle width direction outer side of a lower end portion (base portion) 22L at the vehicle lower side of the front pillar 22.

Figure 2:
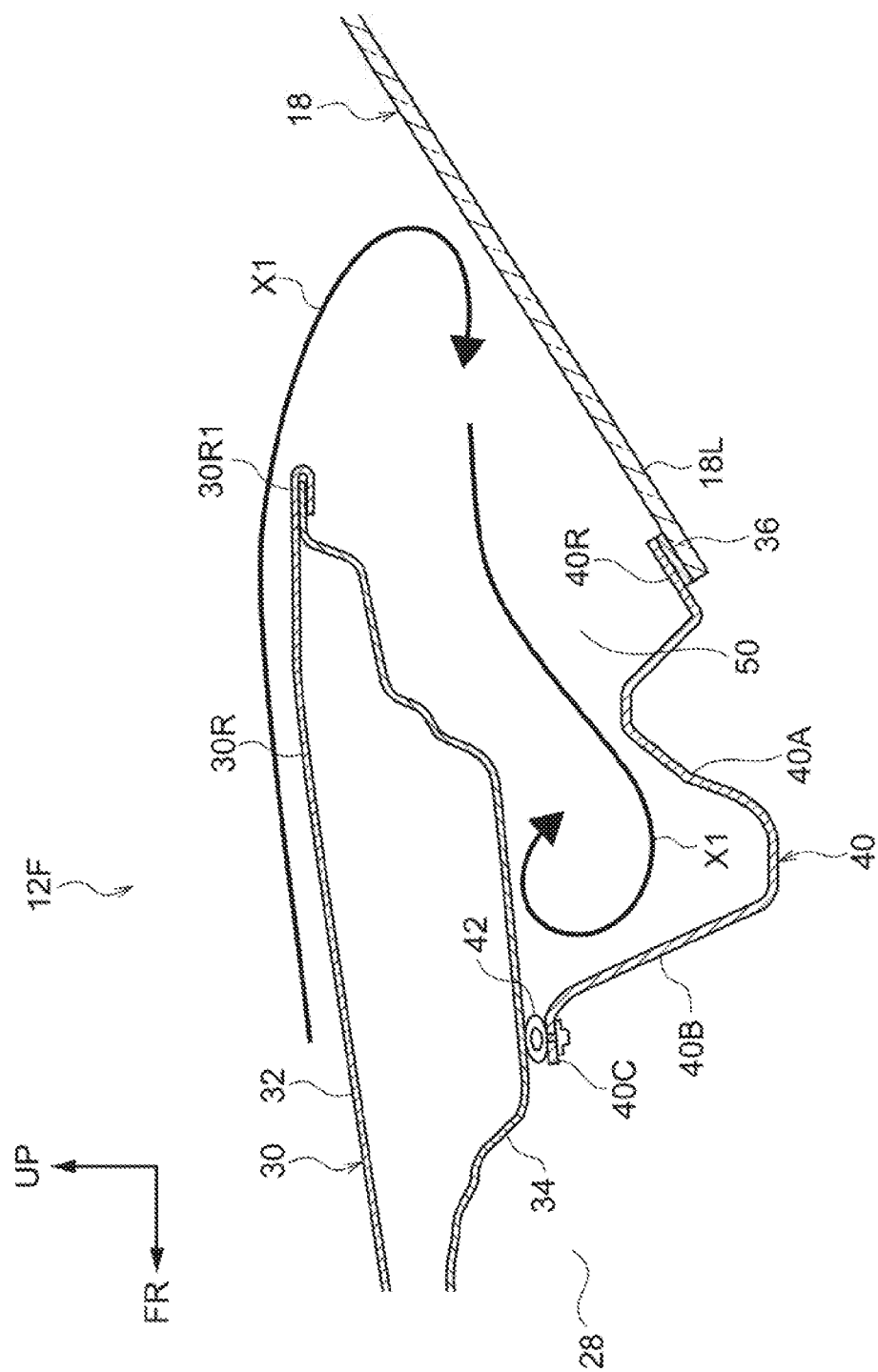
FIG. 2 is a cross-section diagram along line 2-2 of FIG. 1.

As illustrated in FIG. 2, the hood 30 is disposed along the vehicle front-rear direction and the vehicle width direction, and covers a power unit compartment (an engine compartment) 28 in which a power unit, not illustrated in the drawings, is mounted, so as to be able to open and close from the vehicle upper side. The hood 30 includes as hood outer panel 32 and a hood inner panel 34 that are separated from each other in the vehicle up-down direction. The hood outer panel 32 and the hood inner panel 34 face each other in the vehicle up-down direction, and are mutually joined at respective outer peripheral portions. The hood outer panel 32 and the hood inner panel 34 thereby form a closed cross-section.

A lower portion of the front windshield glass 18 is disposed at the vehicle rear side of the hood 30. A lower end portion 18L at the vehicle lower side of the front windshield glass 18 (simply referred to as the "front glass" hereafter) is disposed at the vehicle lower side of a vehicle rear side rear end portion 30R1 of the hood 30. A rear end portion 40R at a vehicle rear side rear of the cowl louver 40 is joined to the lower end portion 18L of the front windshield glass 18 through a sealing member 36.

The cowl louver (cowl top cover) 40 extends along the lower end portion 18L of the front windshield glass 18 in the vehicle width direction, and spans between lower end portions 22L of the pair of front pillars 22 (see FIG. 1). The cowl louver 40 extends out from the lower end portion 18L of the front windshield glass 18 toward the vehicle front side, and is disposed at the vehicle lower side of a rear portion 30R of the hood 30.

The cowl louver 40 is disposed so as to cover between the front windshield glass 18 and the hood 30. Rainwater, wind, and the like from between the front windshield glass 18 and the hood 30 are suppressed from penetrating into the power unit compartment 28 by the cowl louver 40. A wiper storage section 50 is formed between the cowl louver 40 and the rear portion 30R of the hood 30. Note that a wiper 52, described later, is omitted from illustration in FIG. 2.

The cowl louver 40 includes a facing wall 40A and a supporting wall 40B. The facing wall 40A is formed in a shape protruding toward the vehicle upper side. The facing wall 40A extend outs from the lower end portion 18L of the front windshield glass 18 toward the vehicle front side, and faces the rear portion 30R of the hood 30 in the vehicle up-down direction. The supporting wall 40B, which supports the hood 30, is provided at the front end portion of the vehicle front side of the facing wall 40A.

The supporting wall 40B extends out from the front end portion of the facing wall 40A toward the vehicle upper side. A flange portion 40C, which extends out toward the vehicle front side and extends in the vehicle width direction, is provided at an upper end portion of the supporting wall 40B. A sealing member 42 is attached to an upper face of the flange portion 40C. The sealing member 42 is formed in a tube shape, and extends in the vehicle width direction along the flange portion 40C. The rear portion 30R of the hood 30 (the hood outer panel 32) press-contacts the flange portion 40C through the sealing member 42. A gap between the rear portion 30R of the hood 30 and the flange portion 40C of the cowl louver 40 is thereby sealed off by the sealing member 42.

Figure 3:
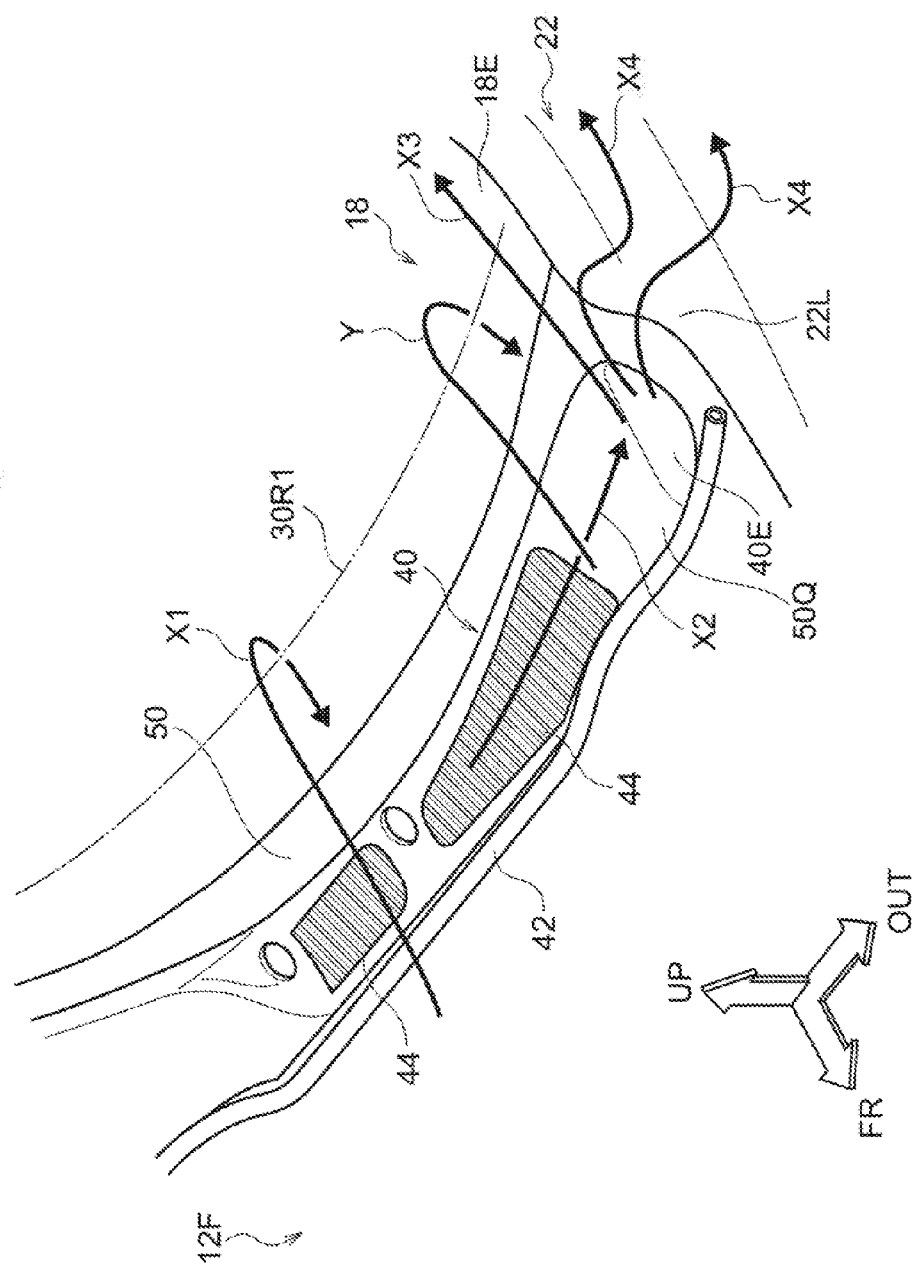
FIG. 3 is a perspective view illustrating the front windshield glass and the cowl louver illustrated in FIG. 2.

As illustrated in FIG. 3, the front pillars 22, described above, extend out from an end portion 40E at the vehicle width direction outer side of the cowl louver 40, toward the vehicle upper side and toward the vehicle rear side along the end portions 18E at the vehicle width direction outer sides of the front windshield glass 18. Slit shaped openings 44 are appropriately formed in the cowl louver 40. The pair of wipers 52 and a flow regulating member 60, described later, are omitted form illustration in FIG. 3.

Figure 4:
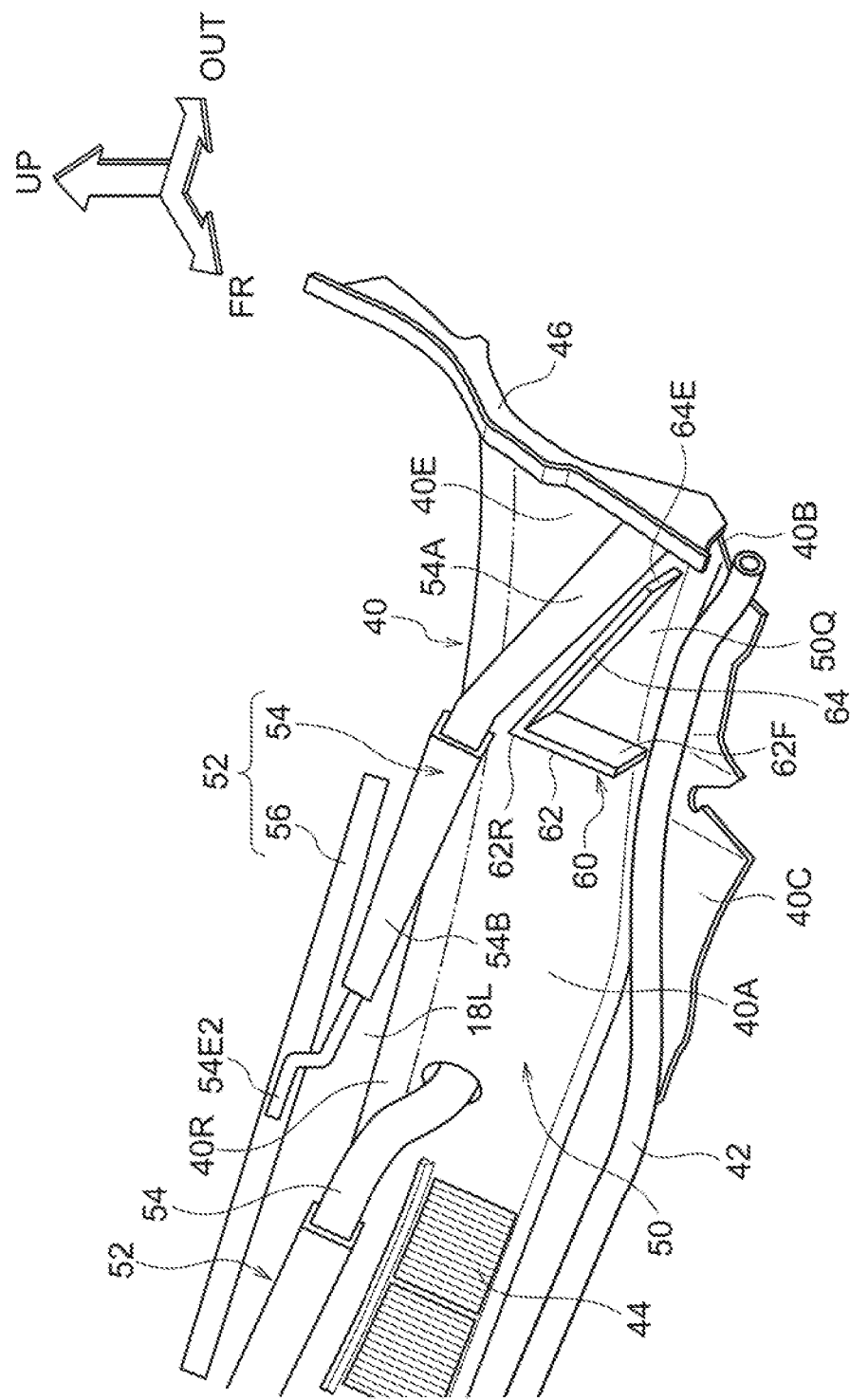
FIG. 4 is an enlarged perspective view illustrating an end portion at a vehicle width direction outer side side of the cowl louver illustrated in FIG. 3.

As illustrated in FIG. 4, a pillar side flow regulating member 46 is provided at the end portion 40E at the vehicle width direction outer side of the cowl louver 40. The pillar side flow regulating member 46 is formed in a plate shape extending in the vehicle front-rear direction along the lower portion of the front pillar 22 (see FIG. 1). The pillar side flow regulating member 46 is disposed with the plate thickness direction of the pillar side flow regulating member 46 in the vehicle width direction. Travelling wind flowing inside the wiper storage section 50 toward the vehicle width direction outer side is guided toward the vehicle upper side along the front pillar 22 by the pillar side flow regulating member 46.

The pair of wipers 52 are stored in the wiper storage section 50. One wiper 52 out of the pair of wipers 52 is attached to a vehicle width direction central portion of the cowl louver 40. An other wiper 52 out of the pair of the wipers 52 is attached to a position at the vehicle width direction outer side end portion 40E side of the cowl louver 40. In the present exemplary embodiment, the pair of wipers 52 are configured similarly to each other. Explanation of the one wiper 52 is therefore omitted, and explanation follows regarding the other wiper 52.

The wiper 52 includes a wiper arm 54 and a wiper blade 56. The wiper arm 54 includes an arm base portion 54A, and an extension 54B that is bent with respect to the arm base portion 54A. As illustrated in FIG. 5, one length direction one end portion (a lower end portion) 54E1 of the arm base portion 54A is attached to a rotation shaft 58 of a wiper module (not illustrated in the drawings) stored at the vehicle lower side of the cowl louver 40. The rotation shaft 58 projects out from a through hole 48 formed in the cowl louver 40.

The arm base portion 54A extends out from the rotation shaft 58 toward the vehicle width direction inner side and toward the vehicle upper side, in a state in which the arm base portion 54A is stored in the wiper storage section 50. As illustrated in FIG. 4, the extension 54B extends out from a length direction other end portion of the arm base portion 54A. A length direction central portion of the wiper blade 56 is rotatably attached to a leading end portion 54E2 of the extension 54B. The wiper blade 56 is disposed along the lower end portion 18L of the front windshield glass 18, in the state in which the arm base portion 54A is stored in the wiper storage section 50. Note that in the following explanation, the orientation of the wiper arm 54 refers to the orientation of the wiper arm 54 in the stored state in the wiper storage section 50, unless specifically stated otherwise.

The flow regulating member 60 is provided at a position at the vehicle width direction outer side of the cowl louver 40. The flow regulating member 60 is, for example, made from resin, and formed integrally to the cowl louver 40. The flow regulating member 60 is disposed at the vehicle front side of the arm base portion 54A in the state in which the arm base portion 54A is stored in the wiper storage section 50.

As illustrated in FIG. 5, the flow regulating member 60 includes a vertical wall 62 and an inclined wall 64. The vertical wall 62 is formed in a plate shape extending in the vehicle front-rear direction, and is disposed with the plate thickness direction of the vertical wall 62 in the vehicle width direction. A rear end portion 62R at the vehicle rear side of the vertical wall 62 is close to the arm base portion 54A in the state in which the arm base portion 54A is stored in the wiper storage section 50. A front end portion 62F at the vehicle front side of the vertical wall 62 is close to, or touches, the supporting wall 40B of the cowl louver 40. The wiper storage section 50 is partitioned in the vehicle width direction by the vertical wall 62.

The inclined wall 64 is formed in a plate shape, and is disposed at the vehicle front side of the arm base portion 54A, in the state in which the arm base portion 54A is stored in the wiper storage section 50, with the plate thickness direction of the inclined wall 64 in the vehicle front-rear direction. The inclined wall 64 extends out from the rear end portion 62R of the vertical wall 62 along the arm base portion 54A in the state in which the arm base portion 54A is stored in the wiper storage section 50, and toward the vehicle width direction outer side and toward the vehicle front side. Namely, the inclined wall 64 is inclined with respect to the vehicle width direction so as to be positioned more toward the vehicle front side on progression from the rear end portion 62R of the vertical wall 62 toward the vehicle width direction outer side. A vehicle width direction outer side end portion 64E of the inclined wall 64 is close to, or touches, the pillar side flow regulating member 46. The wiper storage section 50 is partitioned in the vehicle front-rear direction by the inclined wall 64.

Next, explanation follows regarding operation of the present exemplary embodiment.

According to the present exemplary embodiment, the wiper storage section 50 is formed between the rear portion 30R of the hood 30 and the cowl louver 40. The wiper arm 54 is hard to see from the exterior due to the wiper arms 54 of the pair of wipers 52 being stored in the wiper storage section 50. The appearance of the vehicle front section 12F is thus improved.

As illustrated in FIG. 2 and FIG. 3, when, for example, a travelling wind X1 hits a vehicle width direction central region of the lower portion of the front windshield glass 18 as the vehicle 12 travels, the speed of the travelling wind X1 is reduced, and a portion of the travelling wind X1 flows toward the vehicle front side into the wiper storage section 50 at a low pressure side. As indicated by the arrow X2 in FIG. 3, after the travelling wind X1 has flowed inside the wiper storage section 50 toward the vehicle width direction outer side, the travelling wind X1 is guided toward the vehicle upper side along the pillar side flow regulating member 46 (see FIG. 4), as indicated by the arrow X3.

Travelling wind Y that has hit a region at the vehicle width direction outer side of the front windshield glass 18 flows toward the vehicle front side at a region in the wiper storage section 50 at the vehicle width direction outer side. When the travelling wind Y collides with the travelling wind X2 that flows inside the wiper storage section 50 described above toward the vehicle width direction outer side, the travelling wind X2 becomes disordered, facilitating passing over the pillar side flow regulating member 46 and the lower end portions 22L of the front pillars 22 and exhausting toward the front side doors 24 side. As illustrated in FIG. 1, in cases in which a travelling wind X4 that has been exhausted toward the front side doors 24 side and is disordered irregularly hits against the side mirror 26 of the front side doors 24, this may cause noise (wind noise).

In contrast, as illustrated in FIG. 5, in the present exemplary embodiment, the flow regulating member 60 is provided at the cowl louver 40. The flow regulating member 60 includes the vertical wall 62 and the inclined wall 64. The vertical wall 62 is disposed at the vehicle width direction outer side of the wiper storage section 50 and at the vehicle front side of the arm base portion 54A in the state in which the arm base portion 54A is stored in the wiper storage section 50, and the vertical wall 62 extends in the vehicle front-rear direction. The inner side of the wiper storage section 50 is partitioned in the vehicle width direction by the vertical wall 62.

The travelling wind X2 that flows inside the wiper storage section 50 from the vehicle width direction central side toward the outer side is thereby guided toward the vehicle rear side by the vertical wall 62, as indicated by the arrow a. As a result, the air flow of the travelling wind X2 flowing inside the wiper storage section 50 toward the pillar side flow regulating member 46 side is reduced. Thus, as described above with reference to FIG. 3, the travelling wind X2 is suppressed from becoming disordered in a region at the vehicle width direction outer side of the wiper storage section 50. Accordingly, the air flow of a travelling wind X4 from the wiper storage section 50 that passes over the pillar side flow regulating member 46 and the lower end portions 22L of the front pillars 22, and that is exhausted toward the front side doors 24 (see FIG. 1) side, is reduced.

Moreover, in cases in which the air flow of the travelling wind X2 flowing through an inner side region 50Q at the vehicle width direction outer side of the wiper storage section 50 (see FIG. 5) increases, the travelling wind X2 is liable to pass over the pillar side flow regulating member 46 and the lower end portions 22L of the front pillars 22, and is liable to be exhausted toward the front side doors 24 side.

In contrast, as illustrated in FIG. 5, in the present exemplary embodiment, the inclined wall 64 extends out from the rear end portion 62R of the vertical wall 62 that follows the arm base portion 54A in the state in which the arm base portion 54A is stored in the wiper storage section 50, toward the vehicle width direction outer side and toward the vehicle front side. Namely, the inclined wall 64 is disposed at the vehicle rear side of the wiper storage section 50, in a range where the arm base portion 54A does not interfere. A region at the vehicle width direction outer side of the wiper storage section 50 is thereby raised in level by the inclined wall 64.

Travelling wind Y that has hit a region at the vehicle width direction outer side of the front windshield glass 18 (see FIG. 3) thereby flows toward the pillar side flow regulating member 46 side along the inclined wall 64 as indicated by the arrow b, so as to be suppressed from flowing into the inner side region 50Q of the wiper storage section 50. Accordingly, air flow of the travelling wind X4 from the wiper storage section 50 that passes over the pillar side flow regulating member 46 and the lower end portions 22L of the front pillars 22, and that is exhausted toward the front side doors 24 side, is further reduced.

Moreover, travelling wind that has been guided toward the pillar side flow regulating member 46 side by the inclined wall 64 as indicated by the arrow b is guided toward the vehicle upper side along the pillar side flow regulating member 46 as indicated by the arrow c. Accordingly, the air flow of the travelling wind X4 flowing from the wiper storage section 50, passing over the pillar side flow regulating member 46 and the lower end portions 22L of the front pillars 22, and being exhausted toward the front side doors 24 side, is further reduced.

Moreover, the end portion 64E at the vehicle width direction outer side of the inclined wall 64 is close to, or touches, the pillar side flow regulating member 46. Travelling wind guided toward the pillar side flow regulating member 46 side by the inclined wall 64 as indicated by the arrow b thus easily flows to the vehicle upper site along the pillar side flow regulating member 46 as indicated by the arrow c.

Moreover, the rear end portion 62R of the vertical wall 62 is close to the arm base portion 54A in the state in which the arm base portion 54A is stored in the wiper storage section 50, and the front end portion 62F of the vertical wall 62 is close to, or touches, the supporting wall 40B of the cowl louver 40. The air flow of travelling wind X2 that flows inside the wiper storage section 50 from the vehicle width direction central side toward the pillar side flow regulating member 46 side is thereby efficiently reduced.

Accordingly, the travelling wind X4 from the wiper storage section 50 that passes over the pillar side flow regulating member 46 and the lower end portions 22L of the front pillars 22, and that is exhausted toward the front side doors 24 side, is further reduced. As a result, the travelling wind exhausted toward the front side door side from the wiper storage section is further suppressed from hitting the side mirror 26.

Next, explanation follows regarding modified examples of the above exemplary embodiment.

Although the flow regulating member 60 is provided at one vehicle width direction side of the wiper storage section 50 (the left side in the present exemplary embodiment in the above exemplary embodiment, the above exemplary embodiment is not limited thereto. The flow regulating member 60 may, for example, be provided at the other vehicle width direction side of the wiper storage section 50 according to the position of the rotation shaft 58 of the arm base portion 54A.

When a flow regulating member is provided at the vehicle width direction other side (right side) of the wiper storage section 50 in which the rotation shaft 58 of the wiper arm 54 is not present, it is possible for a lateral wall to extend out horizontally from a rear end portion of the vertical wall in the vehicle width direction; however, the exemplary embodiment above is technology that is especially effective when the installation space of the flow regulating member 60 is restricted by the wiper arm 54. In such cases, noise (wind noise) can be efficiently reduced in the exemplary embodiment above.

Although the pillar side flow regulating member 46 is provided along the front pillars 22 in the exemplary embodiment above, the pillar side flow regulating member 46 may be omitted.

Supplementary explanation follows regarding the vehicle width direction position of the vertical wall 62. In the present exemplary embodiment, since the installation space of the vertical wall 62 is narrowed by moving the vertical wall 62 toward the pillar side flow regulating member 46 side, the vehicle front-rear direction length of the vertical wall 62 is shortened. Accordingly, moving the vertical wall 62 toward the pillar side flow regulating member 46 side causes the travelling wind X2 that flows inside the wiper storage section 50 from the vehicle width direction central side toward the outer side to be more liable to pass over the vertical wall 62. Accordingly, it is possible that the travelling wind X4 from the wiper storage section 50 that passes over the pillar side flow regulating member 46 and the lower end portions 22L of the front pillars 22, and is exhausted toward the front side doors 24 side, will increase.

However, moving the vertical wall 62 to the side opposite the pillar side flow regulating member 46 (the vehicle width direction central side) widens the spacing between the vertical wall 62 and the pillar side flow regulating member 46. Accordingly, the air flow of travelling wind flowing in toward the vehicle front side between the vertical wall 62 and the pillar side flow regulating member 46 increases. Accordingly, it is possible that the travelling wind X4 from the wiper storage section 50 that passes over the pillar side flow regulating member 46 and the lower end portions 22L of the front pillars 22, and that is exhausted toward the front side doors 24 side, will increase.

The vehicle width direction position of the vertical wall 62 is, for example, appropriately set in consideration of the above, and, in the above exemplary embodiment, is, for example, set to a position moved from one end portion 54E1 of the arm base portion 54A toward the vehicle width direction inner side by a quarter of the overall, length of the wiper arm 54, or in the vicinity of this position.

Although explanation has been given regarding one exemplary embodiment of the present disclosure, the present disclosure is not limited to such an exemplary embodiment. It is obvious that the exemplary embodiment may be employed in combination with various modified examples as appropriate, and that various embodiments are possible within a range not departing from the spirit of the present disclosure.

What is claimed is:

1. A vehicle front section structure comprising:
   a hood provided at a vehicle front section;
   a front windshield glass disposed at a vehicle rear side of the hood;
   a cowl louver that extends in a vehicle width direction along a lower end portion of the front windshield glass, that extends out from the lower end portion toward as vehicle front side, and that is disposed at a vehicle lower side of the hood;
   a front pillar that extends out from an end portion at a vehicle width direction outer side of the cowl louver toward a vehicle upper side and toward the vehicle rear side along an end portion in the vehicle width direction outer side of the front windshield glass;
   a front side door that comprises a side mirrors disposed at the vehicle width direction outer side of, and at the vehicle rear side of, a lower end portion of the front pillar, and that is provided at a vehicle side portion;
   a wiper arm comprising an arm base portion having one end portion attached to a rotation shaft provided at a position at the vehicle width direction outer side of the cowl louver, and extending out from the rotation shaft toward a vehicle width direction inner side and toward the vehicle upper side in a state in which the arm base portion is stored in a wiper storage section formed between the hood and the cowl louver; and
   a flow regulating member that is provided at the cowl louver, that is disposed in the wiper storage section at the vehicle width direction outer side and at the vehicle front side of the arm base portion in the state in which the arm base portion is stored in the wiper storage section, and that comprises a vertical wall extending in a vehicle front-rear direction and an inclined wall disposed at the vehicle front side of the arm base portion, in the state in which the arm base portion is stored in the wiper storage section, and extending out from a rear end portion of the vertical wall toward the vehicle width direction outer side and toward the vehicle front side along the at base portion.

2. The vehicle front section structure of claim 1, further comprising:
   a pillar side flow regulating member that is provided along a lower portion of the front pillar, and that guides, toward the vehicle upper side, wind flowing in the wiper storage section toward the vehicle width direction outer side,
   wherein an end portion at the vehicle width direction outer side of the inclined wall is close to, or touches, the pillar side flow regulating member.

3. The vehicle front section structure of claim 2, wherein the pillar side flow regulating member is formed in a plate shape extending in the vehicle front-rear direction along the lower portion of the front pillar, and is disposed with a plate thickness direction of the pillar side flow regulating member in the vehicle width direction.

4. The vehicle front section structure of claim 1, wherein the rear end portion at the vehicle rear side of the vertical wall is close to the arm base portion in the state in which the arm base portion is stored in the wiper storage section.

5. The vehicle front section structure of claim 1, wherein: the cowl louver comprises:
- a facing wall that extends out from the lower end portion of the front windshield glass toward the vehicle front side, and that faces a rear portion at the vehicle rear side of the hood in a vehicle up-down direction; and
- a supporting wall that extends out from a front end portion at the vehicle front side of the facing wall toward the vehicle upper side, and that supports the hood; and a front end portion at the vehicle front side of the vertical wall is close to, or touches, the supporting wall.

6. The vehicle front section structure of claim 1, wherein the cowl louver is disposed so as to cover between the hood and the lower end portion of the front windshield glass.

7. The vehicle front section structure of claim 1, wherein the vertical wall is formed in a plate shape extending in the vehicle front-rear direction, and is disposed with a plate thickness direction of the vertical wall in the vehicle width direction.

8. The vehicle front section structure of claim 1, wherein the inclined wall is formed in a plate shape, and is disposed with a plate thickness direction of the inclined wall in the vehicle front-rear direction.

9. The vehicle front section structure of claim 1, wherein the inclined wall is inclined with respect to the vehicle width direction so as to be positioned more toward the vehicle front side on progression from the rear end portion of the vertical wall toward the vehicle width direction outer side.

10. The vehicle front section structure of claim 1, wherein the wiper arm comprises an extension that extends out from another end portion of the arm base portion, is bent with respect to the arm base portion, and has a leading end portion to which a wiper blade is rotatably attached.

* * * * *